United States Patent
Walheim et al.

(10) Patent No.: US 8,222,141 B2
(45) Date of Patent: Jul. 17, 2012

(54) METHOD FOR PRODUCING AN ORGANOMETALLIC LAYER

(75) Inventors: Stefan Walheim, Weingarten (DE);
Thomas Schimmel, Karlsruhe (DE);
Matthias Barczewski, Baden-Baden (DE); Marcel Mayor, Karlsruhe (DE);
Alfred Blaszczyk, Eggenstein-Leopoldshafen (DE)

(73) Assignee: Forschungzentrum Karlsruhe GmbH, Karlsruhe (DE)

( * ) Notice: Subject to any disclaimer, the term of this patent is extended or adjusted under 35 U.S.C. 154(b) by 556 days.

(21) Appl. No.: 11/916,512

(22) PCT Filed: May 18, 2006

(86) PCT No.: PCT/EP2006/004704
§ 371 (c)(1), (2), (4) Date: Jun. 21, 2010

(87) PCT Pub. No.: WO2006/131194
PCT Pub. Date: Dec. 14, 2006

(65) Prior Publication Data
US 2010/0273328 A1    Oct. 28, 2010

(30) Foreign Application Priority Data
Jun. 4, 2005  (DE) .................. 10 2005 025 693

(51) Int. Cl.
*H01L 21/44*  (2006.01)
(52) U.S. Cl. ............... 438/687; 257/E21.299; 438/85; 438/104; 438/681
(58) Field of Classification Search ........... 257/E21.299; 438/85, 104, 681, 687
See application file for complete search history.

(56) References Cited

U.S. PATENT DOCUMENTS

| 6,114,099 A | 9/2000 | Liu et al. |
| 6,277,489 B1 | 8/2001 | Abbott et al. |
| 7,148,144 B1 * | 12/2006 | Avanzino .............. 438/687 |

FOREIGN PATENT DOCUMENTS

| EP | 1568800 A1 | 8/2005 |
| WO | WO 2004030040 A2 | 4/2004 |

OTHER PUBLICATIONS

Shantang Liu et al., "Template Guided Self-Assembly of [Au55] Clusters on Nanolithographically Defined Monolayer Patterns", Nano Letters American Chemical Society, USA, vol. 2, No. 10, 2002, pp. 1055-1060, XP002390399.

(Continued)

*Primary Examiner* — Asok Sarkar
(74) *Attorney, Agent, or Firm* — Leydig, Voit & Mayer, Ltd.

(57) ABSTRACT

A method for producing an organometallic layer includes providing a substrate having at least a layer with atoms of an oxidizable metal on its surface. The surface is exposed to a fluid that includes organic molecules having at least two functional groups that contain elements of main group VI such that the atoms of the oxidizable metal form a bond with the organic molecules. By consumption of the atoms of oxidizable metal and of the organic molecules, the organometallic layer is formed on the substrate at locations on the surface of the substrate where the atoms of oxizable are disposed, the atoms of oxizable metal being incorporated into the organometallic layer. A thickness of the organometallic layer is determined by a duration of the exposing, a thickness of the layer including the atoms of the oxidizable metal, and the number of organic molecules in the fluid.

20 Claims, 4 Drawing Sheets

OTHER PUBLICATIONS

Chen Xiaohua et al. "Polymer pattern formation on SiO2 surfaces using surface monolayer initiated polymerization", Journal of Vacuum Science and Technology. B, Microelectronics and Nanometer Structures Processing, Measurement and Phenomena, American Institute of Physics, New York, NY, USA, vol. 19, No. 6, Nov. 2001, pp. 2013-2019, XP012008989.

Rivka Maoz et al. "Targeted Self-Replication of Silane Multilayers", Advanced Materials, WILEY-VCH, Weirtheim, Germany, vol. 10, No. 8, Jun. 2, 1998, pp. 580-584, XP000766720.

Stephen D. Evans et al. "Self-Assembled Multilayers of Omega-Mercapioalkanoic Acids: Selective Ionics Interactions", Journal of the American Chemical Society, American Chemical Society, Washington, DC, US, vol. 113; 1991, pp. 5866-5868, XP000857638.

Pradyut Ghosh et al. "Two New Approaches for Patterning Polymer Films Using Templates Prepared by Microcontact Printing", Macromolecules 2001, vol. 34, No. 5, 2001, pp. 1230-1236, XP002390400.

S. D.:Evans et al. "Self-Assembled Multilayer Formation on Predefined Templates", Lagmuir 1995, vol. 11, 1995, pp. 3811-3814, XP002390395.

Weijin Li et al. "Self-Assembled Monolayers of 7-(10-Thiodecoxy)coumarin on Gold: Synthesis, Characterization; and Photodimerization", Journal of the American Society, vol. 119, 1997, pp. 7211-7217, XP002390396.

B.H. Hong et al., "Ultrathin Single-Crystalline Silver Nanowire Arrays Formed in an Ambient Solution Phase", Science, vol. 294, pp. 348-351, 2001.

I.G. Dance et al., "Layered Structure of Crystalline Compounds AgSR", Inorg. Chem., vol. 30, pp. 183-187, 1991.

A.N. Parikh, "Characterization of Chain Molecular Assemblies in Long-Chain, Layered Silver Thiolates: A Joint Infrared Spectroscopy and X-Ray Diffraction Study", J. Physical Chemistry B, vol. 103, pp. 2850-2861, 1999.

H.G. Fijolek et al., "Structure-spectroscopy correlations in silver thiolates: Application to the structure of silver 1,5-pentanedithiolate", Inorg. Chemistry, vol. 36, pp. 5299-5305, 1997.

H.J. Choi et al., "Temperature-dependent FT-IR spectroscopy study of silver 1,9-nonanedithiolate", Applied Spectroscopy, vol. 55, pp. 1085-1091, 2001.

* cited by examiner

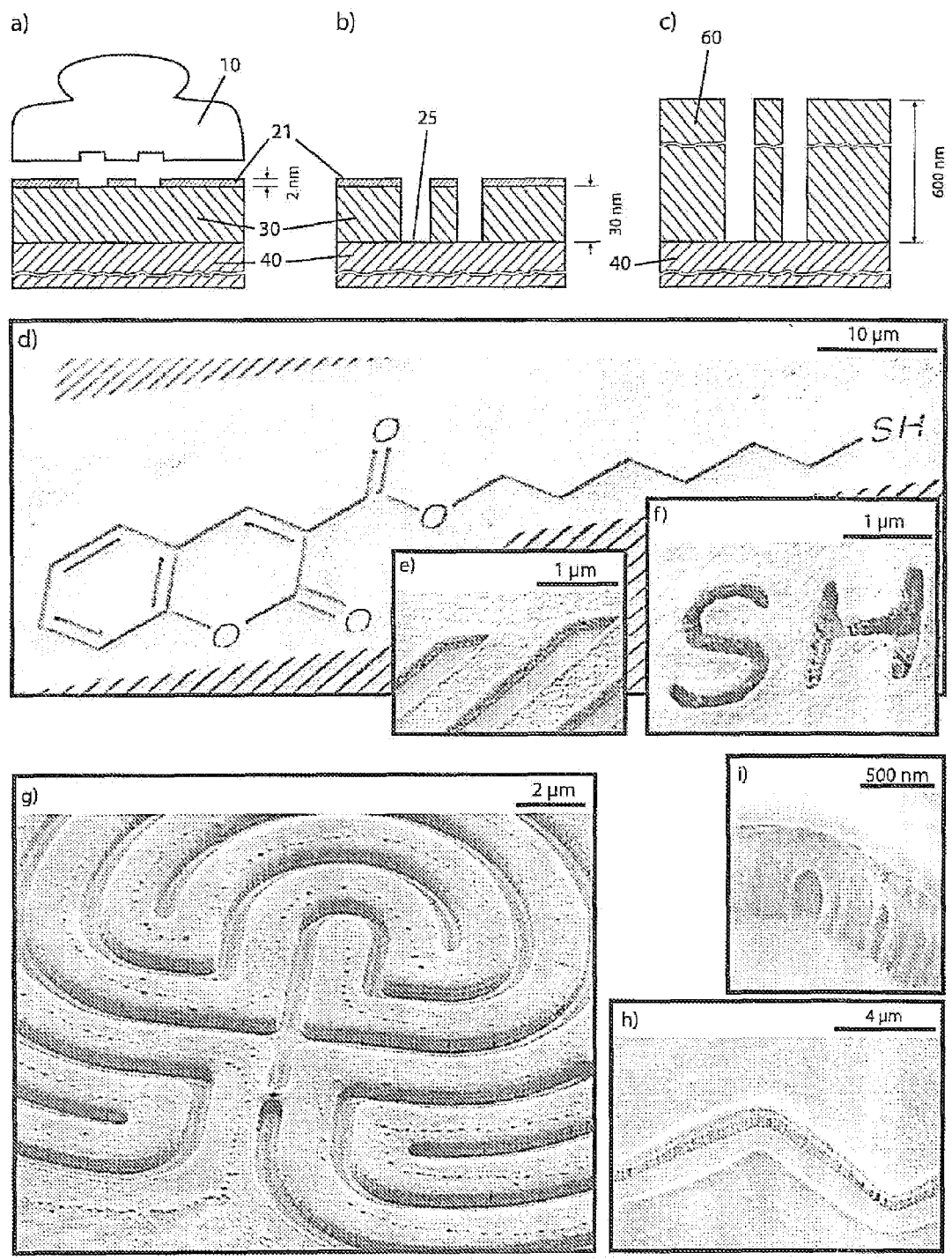

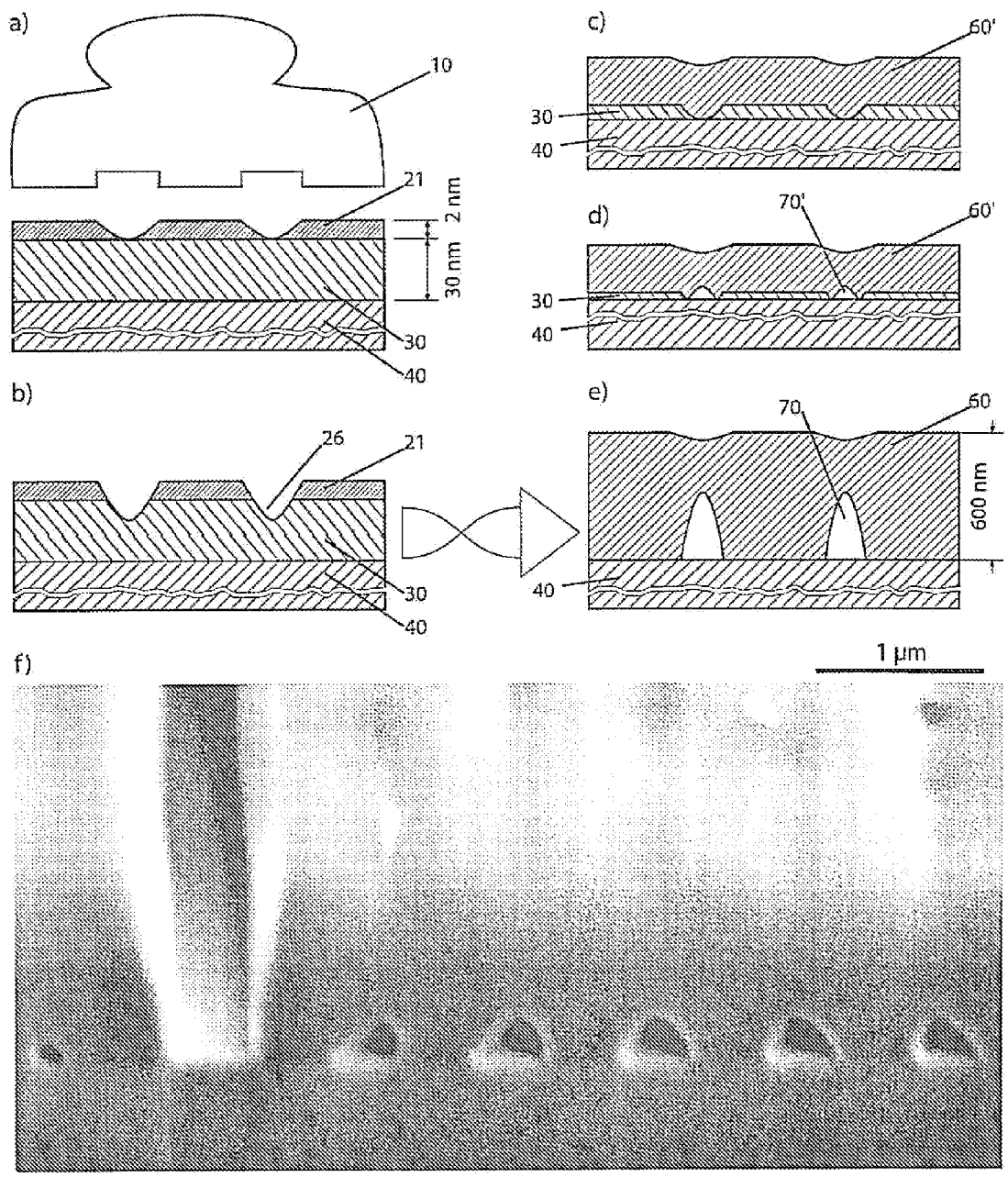

METHOD FOR PRODUCING AN ORGANOMETALLIC LAYER

CROSS REFERENCE TO RELATED APPLICATIONS

This is a U.S. National Phase application under 35 U.S.C. §371 of International Application No. PCT/EP2006/004704, filed on May 18, 2006, and claims the benefit of German Patent Application No. 10 2005 025 693.7, filed on Jun. 4, 2005. The International Application was published in German on Dec. 14, 2006 as WO 2006/131194 A1 under PCT Article 221(2).

FIELD OF THE INVENTION

The invention relates to a method for producing an organometallic layer, to organometallic layers produced by means of this method, and to their use.

BACKGROUND

Organometallic materials, especially those with a controlled spatial arrangement, are playing an ever-expanding role in the semiconductor industry. Owing to their electric and dielectric properties, they are employed in solar cells, light-emitting diodes, photodetectors, transistors and microchips. In order to produce technical functional units, it is indispensable in many cases to apply the organometallic material in the form of a thin, homogenous layer that covers the flat substrate. However, up until now, such functional units on the basis of organometallic materials could only be produced over very small crystalline regions.

The Langmuir-Blodgett technique may be employed to produce thin organic films that consist of monolayers up to a few hundred layers and that generally exhibit non-linear properties which are utilized, for instance, to generate frequency-doubled light. A basic prerequisite in this context is the anisotropic orientation of the molecules. Here, as well, in addition to purely organic molecules, organometallic compounds are now playing an increasing role.

Up until now, organometallic layers have usually been produced by means of deposition processes and they display crystalline regions with numerous crystal boundaries.

F. Ghosh, W. M. Lackowski and R. M. Crooks, "Two New Approaches for Patterning Polymer Films Using Templates Prepared by Microcontact Printing", Macromolecules, volume 34, pages 1230 to 1236, and X. Chen., L. M. Tolbert, C. L. Henderson, D. W. Hess, and J. Rühe, "Polymer pattern formation on $SiO_2$ surfaces using surface monolayer initiated polymerization", J. Vac. Sci. Technol., volume 19(6), pages 2013 to 2019, 2001, describes the lateral structuring and activation of substrates and subsequent polymerization of three-dimensional macromolecular objects. With this approach, however, so far it has only been possible to produce laterally structured organic layers that are a few nanometers thick, in addition to which the steepness of the edges of the structures is insufficient.

S. D. Evans, A. Ulman, K. E. Goppert-Berarducci, and L. J. Gerenser, "Self-Assembled Multilayers of ω-Mercaptoalkanoic Acids: Selective Ionic Interactions", J. Am. Chem. Soc., volume 113, pages 5866 to 5868, 1991, and S. D. Evans, T. M. Flynn, and A. Ulman, "Self-Assembled Multilayer Formation on Predefined Templates", Langmuir, volume 11, pages 3811 to 3814, 1995, describes a method in which, at first, a passivating monolayer of a first molecule is stamped and subsequently, a monolayer of a second molecule, which has a polar terminal group (carboxyl), is inserted into the interstices. Following a thorough washing procedure, the specimen is exposed to a copper acetate solution, a process in which a thin copper ion layer is formed on the top surface of the self-organizing monolayer. After another washing procedure, the specimen is once again exposed to the second type of molecule, a process in which another monolayer is created. The layer can be slowly built up by repeating the process steps. Film thicknesses of up to 50 nm have been achieved employing this method. A drawback of this is that the continuous changing of the process baths and the long retention times of the specimen in these baths render this process very complex and time-consuming.

This method is closely related to approaches employed by R. Maoz and J. Sagiv, "Targeted Self-replication of Silane Multilayers", Adv. Mater., volume 10, no. 8, pages 580 to 584, 1998, with which, however, it was only possible to obtain layers having a thickness of just a few nanometers. By means of force microscopy in S. Liu, R. Maoz, G. Schmid and J. Sagiv, "Template Guided Self-Assembly of [$Au_{55}$] Clusters on Nanolithographically Defined Monolayer Patterns", Nanoletters, volume 2, no. 10, pages 1055 to 1060, 2002, very fine lines were activated for the growth and decorated with larger metal objects (gold clusters).

W. Li, V. Lynch, H. Thompson and M. A. Fox, "Self-Assembled Monolayers of 7-(10-thiodecoxy)coumarin on Gold: Synthesis, Characterization, and Photodimerization", J. Am. Chem. Soc., volume 119, pages 7211 to 7217, 1997, describes that many thiol molecules, including coumarin thiols, form a densely-packed, self-organizing monolayer on the surface of coinage metals.

B. H. Hong, S. C. Bae, C.-W. Lee, S. Jeong and K. S. Kim, "Ultrathin Single-Crystalline Silver Nanowire Arrays Formed in an Ambient Solution Phase", Science, volume 294, pages 348 to 351, 2001, describes silver nanowires that are formed in a catalytic, crystalline, organic host material under ambient conditions. Monocrystalline regions that are filled with these silver nanowires were produced and examined by means of X-ray diffraction.

I. G. Dance, K. J. Fisher, R. M. H. Banda and M. L. Scudder, "Layered Structure of Crystalline Compounds AgSR", Inorg. Chem., volume 30, pages 183 to 187, 1991, describes a crystalline powder from the precipitation reaction of the AgSR type, wherein R stands for an organic radical that consists essentially of a central plane made up of silver atoms in a quasi-hexagonal arrangement that are bonded by bridging SR groups whose organic part faces in both directions parallel to the surface normal and thus perpendicular to the silver planes.

A. N. Parikh, "Characterization of Chain Molecular Assemblies in Long-Chain, Layered Silver Thiolates: A Joint Infrared Spectroscopy and X-Ray Diffraction Study", J. Physical Chemistry B, volume 103, pages 2850 to 2861, 1999, reports on examinations carried out on these crystalline thiolate materials (all powders from a precipitation reaction) and shows that the thiol molecules arrange themselves head-to-head through the mediation of van der Waals interaction. X-ray examinations of these substances reveal an entire set of periodical reflections, as is characteristic of a well-ordered plate system. The distance of the plates thus obtained corresponds exactly to twice the molecule length. The sulfur-to-silver ratio is 1:1.

H. G. Fijolek, P. Gonzalez-Duarte, S. H. Park, S. L. Suib and M. J. Natan, "Structure-spectroscopy correlations in silver thiolates: Application to the structure of silver 1,5-pentanedithiolate", Inorg. Chemistry, volume 36, pages 5299 to 5305, 1997, and H. J. Choi, S. W. Han, S. J. Lee and K. Kim, "Temperature-dependent FT-IR spectroscopy study of silver 1,9-nonanedithiolate", Applied Spectroscopy, volume 55, pages 1085 to 1091, 2001, describe dithiolates that are likewise produced by precipitation reactions. Here, too, structures with a lamellar arrangement are created. However, X-ray examinations reveal much wider reflections, which are an indication of a less ordered structure.

SUMMARY

Therefore, an aspect of the present invention is to provide a method for producing organometallic layers, the organometallic layers that are produced by this method, as well as their use, whereby the drawbacks of the aforementioned methods and of the organometallic layers thus produced are avoided or reduced.

In an embodiment, the present invention provides a method for producing an organometallic layer. The method includes providing a substrate having a layer with atoms of an oxidizable metal on a surface of the substrate. The surface is exposed to a fluid that includes organic molecules having at least two functional groups that contain elements of main group VI such that the atoms of the oxidizable metal form a bond with the organic molecules. By consumption of the atoms of oxidizable metal and of the organic molecules, the organometallic layer is formed on the substrate at locations on the surface of the substrate where the atoms of oxizable are disposed, the atoms of oxizable metal being incorporated into the organometallic layer. A thickness of the organometallic layer is determined by a duration of the exposing, a thickness of the layer including the atoms of the oxidizable metal, and the number of organic molecules in the fluid.

The atoms of the oxidizable metal form a bond with the organic molecules so as to form the organometallic layer. The thickness of the organometallic layer is determined by the duration of the method, the thickness of the layer with the atoms of oxidizable metal, and the number of organic molecules in the fluid.

BRIEF DESCRIPTION OF THE DRAWINGS

The invention will be described in greater detail below with reference to expemplary embodiments and the drawings, in which.

FIG. 3 shows a schematic depiction of the method to create inverted lithographic structures;

FIG. 4 illustrates production of covered channels.

DETAILED DESCRIPTION

Figure 1:
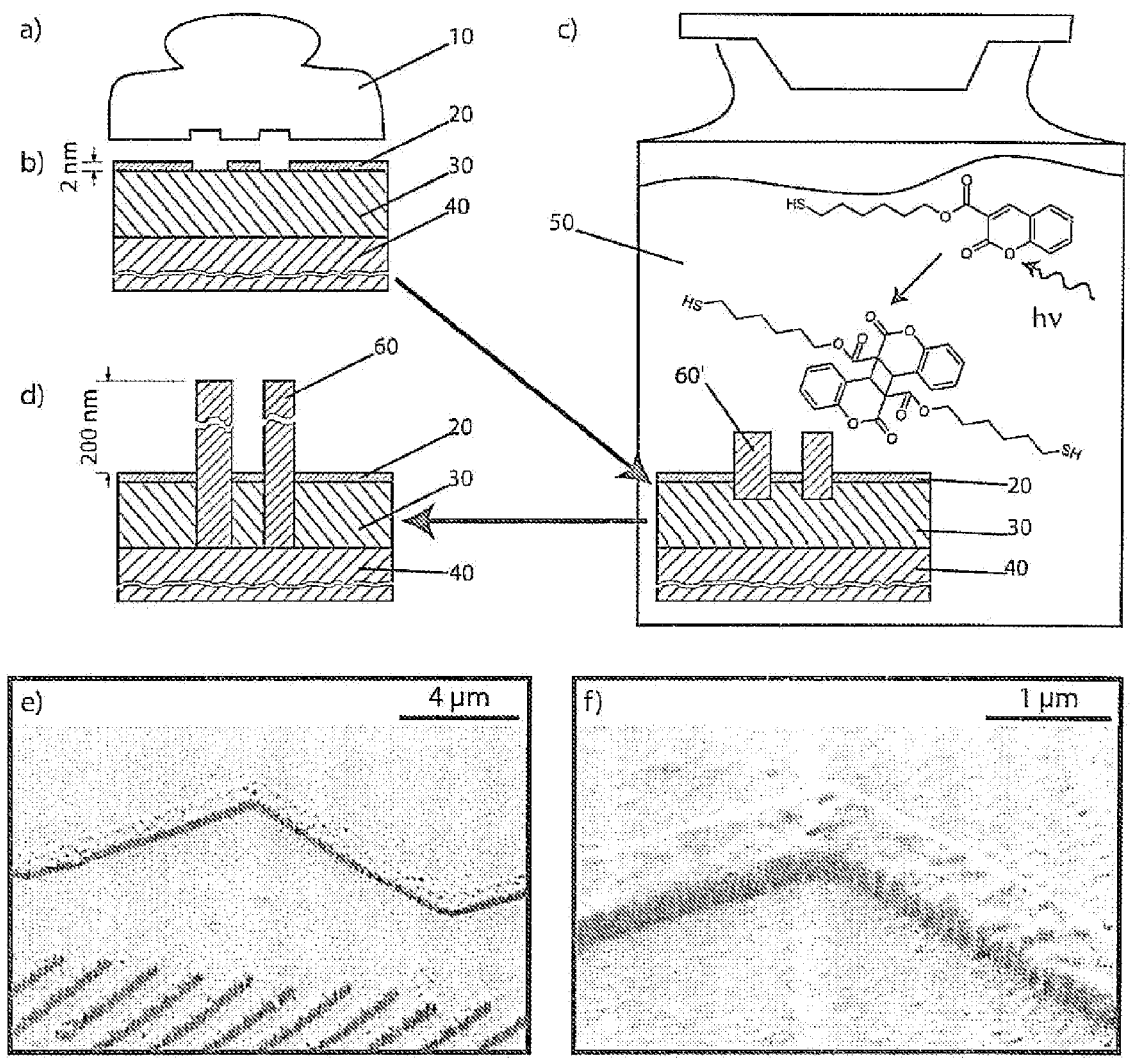
FIG. 1 shows a schematic depiction of the method according to the invention.

In order to execute the method according to the invention, first of all, a substrate is provided whose surface has atoms of an oxidizable metal or is itself made up of atoms of an oxidizable metal.

In an embodiment, a flat semiconductor wafer, for example, made of silicon and coated with a thin layer (film) of an oxidizable metal, is provided as the substrate. In an alternative embodiment, metallic or metal-coated particles are used as the substrate. In this context, the substrate can be made up of one, two or more consecutive layers and can consist of the same metal or of different metals.

Suitable are all oxidizable metals that form a bond with at least one of the following functional groups: thiol groups, SeH—S—S groups and disilenide groups, as well as their oxides. These include, in particular, silver, copper, cobalt, iron, nickel, lead, cadmium, molybdenum, zinc, tin, antimony, vanadium, arsenic, rhenium, mercury, manganese, ruthenium, bismuth and tungsten as well as their oxides, preference being given to the coinage metals, that is to say, silver, copper, nickel, platinum, palladium, zinc or tin as well as their oxides. Especially preferred are silver, copper, their alloys such as, for instance, $Cu_{75}Ni_{25}$, $Cu_{75}Zn_{20}Ni_5$ or $Cu_{89}Al_5Zn_5Sn_1$ and their oxides.

In an embodiment, a structured substrate is employed. Accordingly, certain regions of the surface of the substrate remain free of oxidizable metal. In order to produce such a laterally structured metal layer, embossing techniques can be used in addition to conventional lithographic processes such as, for example, exposure to ultraviolet light, and to ion or electron beams.

In an embodiment of the method, a structured passivation or activation layer is applied onto certain regions of the surface of the substrate. For this purpose, the surface of the substrate is provided in selected regions with a cover layer that covers the atoms of the oxidizable metal in these regions. A molecule or polymer layer, a self-organized monolayer or a Langmuir-Blodgett film, and a monolayer consisting of thiol molecules may be employed as the cover layer.

Ultra-thin, self-organizing monolayers can be applied onto the substrate by being laterally structured with microcontact stamps or—in the case of a higher resolution—by means of structured application or removal employing scanning probe methods or by means of electron-beam lithography. According to the invention, these layers that are monomolecular or just a few nanometers thick can serve as a resist for growth. In this manner, the self-organized, anisotropic growth process of the organometallic layer is laterally controlled.

In another embodiment, the structured monolayers are used as ultra-thin resist layers to etch the metal layer. The molecule that builds up the organometallic layer displaces the resist layer and the growth starts in the regions that had been protected until then, or else, through the selection of suitable molecules that block off the etching process as well as the growth of the layer, growth only occurs on the etched edges that generally have an angle of about 45° relative to the substrate plane.

In an embodiment, the molecules that later build up the organometallic layer are stamped onto the substrate or else structured by means of scanning probe methods. After the etching process, the growth starts immediately and unrestrictedly in the non-etched regions. If the etching process is not carried out completely, differences or gradients result in the layer thickness that are correspondingly transferred or intensified during growth. If the etching is only done in a punctiform pattern or along a narrow line, the result is covered cavities or tunnels, in other words, structures that are very difficult to produce with conventional lithographic methods.

It is possible to combine both variants in such a way that, on one and the same substrate, there are certain regions of the surface of the substrate without any oxidizable metal while other regions of the same substrate are provided with a cover layer.

In an embodiment, if the substrate has an oxidizable metal only in certain regions of its surface and if the thickness of the organometallic layer is limited by the thickness of the layer of atoms of the oxidizable metal that are applied onto those regions on the substrate that are not covered by a cover layer, then overhanging structures are formed in the organometallic layer.

Moreover, in another especially preferred embodiment, if the thickness of the layer of atoms of the oxidizable layer that are applied onto the substrate exhibits local minima in certain regions of the substrate, whereby the layer thickness, however, does not recede all the way down to zero, then cavities or tunnel-like structures are formed in the organometallic layer in these regions.

In order to produce an organometallic layer, a selected substrate is exposed to a fluid, that is to say, a solution, or to the gas phase, comprising organic molecules with two, three or more functional groups that contain at least one element of main group VI. Owing to consumption of the metal and of the organic molecules, an organometallic layer according to the invention is formed. During the growth, the metal may be incorporated stoichiometrically into the organometallic layer that is being formed, so that a bond may be created between the metal atoms and the organic molecules. This bond is a covalent, ionic, coordinative bond or a van der Waals bond or a mixed type consisting of these bonds.

The thickness of the layer can be regulated by the duration of the growth process, by the thickness of the metal film that has been previously applied onto the substrate or by the consumption or removal of organic molecules. If an already laterally structured metal layer is employed, a laterally structured organometallic layer is formed since the growth of the layer only takes place at those places where the atoms of the oxidizable metal lie directly on the surface of the substrate.

The invention may include the use of organic molecules having two or three functional groups containing sulfur or selenium. In a specific embodiment, molecules having two or more thiol groups may be used. Also, molecules having at least two Se—H groups or diselenide groups are fundamentally capable of building up organometallic layers according to the invention.

The molecules N,N-bis(6-mercaptohexyl)-4,4-bipyridine dibromide, 1,2-ethane dithiol, 1,3-propane dithiol, 1,4-butane dithiol, 1,5-pentane dithiol, 1,6-hexane dithiol, 1,8-octane dithiol, 1,9-nonane dithiol, 1,2-benzene dithiol, 1,3-benzene dithiol, 1,4-dithioerythritol, 4,5-diamino-2,6-dimercaptopyrimidine and 6,8-dimercaptopurine N, N-bis(6-mercaptohexyl)-4,4-bipyridine dibromide with two functional groups as well as trithiocyanuric acid and trimethylopropane-tris(3-mercaptopropionate) with three functional groups may be used, for example.

Other molecules having two or more thiol groups that may be used in the invention are 4-dithio-L-threitol, 1,4-dithio-DL-threitol, 2,3-dimercapto-1-propanol, 2,4-dimercapto-5-methylpyrimidine, 2,6-dimercapto-7-methyl purine, 2,6-dimercaptopurine, 2,8-dimercapto-6-hydroxypurine, 2,9-P-methane dithio, 2-hydroxymethyl-2-methyl-1,3-propane diol-tris(3-mercaptopropionate), 6,8-dimercapto-2-hydroxypurine, 7-methyl-2,6,8,trimercaptopurine, 2,3-dimercapto-propane-1-sulfonate, 2,6-dithiopurine, bismuthiol I, dithiothreitol, DL-dithiothreitol, dihydrolipoic acid, meso-2,3-dimercaptobutane diacid, toluene-3,4-dithiol, 1,3,4-trimercapto-butan-2-ol, 1,3,4-trimercapto-butanol-(2)-tetraacetate, 2,4,6-trimercapto-phenol, 3,6,8-trimercapto[2] naphthol or carbonic acid-ethyl ester(3,6,8-trimercapto[2] naphthyl ester).

Due to their toxic properties, the following molecules are less suitable in actual practice: meso-2,3-dimercapto-succinic acid, bis(tetraethyl ammonium)bis (dimercaptomaleic acid nitrile)nickelate (II), bis(tetraethyl ammonium)bis (dimercaptomalic acid nitrile)zinkate(II), bis(tetraethyl ammonium)bis(2-thioxo-1,3-dithiol-4,5-dithiolato)zinkate (II), (3-mercaptomethyl-1,4,7,10,13,16-hexaoxacyclooctadec-2-yl)-methane thiol, meso-2,5-dimercapto-adipic acid, tetraethylammonium-bis(3,4,5,6-tetrakis(methylthio)benzene-1,2-dithiolato)zinkate, tetraethylammonium-bis(4,7-bis(methylthio)benzo-1,3-dithiol-2-on-5,6-dithiolato) zinkate.

The position of the functional groups indicated in each case is relevant for the resultant structure of the material. Moreover, related molecules with other group positions are also suitable.

In an embodiment, the organic molecules are formed before or while the substrate is being exposed to the fluid. Suitable for this purpose are organic molecules having a functional group comprising elements of main group VI as precursors which are then dimerized to form organic molecules having two functional groups containing elements of main group VI. These include molecules that have disulfide groups as the functional groups that can be converted into a molecule having two thiol groups by means of photodimerization or else thermally.

6-mercaptohexyl coumarin-3-carboxylate as well as its disulfide are suitable, for example, as precursors before or during the growth process. This coumarin derivative forms organometallic layers after exposure to ultraviolet light, as a result of which photodimers having two thiol groups of this thiol molecule are formed that then build up the organometallic layer.

Moreover, the fluid can contain one, two or more additional types of organic molecules at the same time, or the organic molecules can be introduced one after the other.

The organic molecule(s) is/are dissolved in a fluid, that is to say, in a liquid or gaseous solvent. During the search for suitable organic molecules, the appertaining suitable solvents were also determined. In this process, it was ascertained that air constitutes a suitable solvent. This choice has the advantage that the substrate merely has to be incorporated into the gas phase of the organic molecule in question in order to achieve layer growth.

This finding considerably simplifies the production of the layers and avoids, in particular, the destruction of filigree lithographic structures due to the capillary effect of an evaporating solvent. This capillary effect, which poses a problem in almost all commonly employed lithographic processes, however, is not by definition present in the case of growth from the gas phase.

It was also ascertained that higher temperatures (in the range of about 70° C. [158° F.]) bring about considerably higher growth rates for the organometallic layers according to the invention.

Along the lines described, the organometallic layer is formed on the substrate in that the metal atoms from the substrate form a bond with the organic molecules that are present in the fluid.

With the inventive method for substrate-induced growth of an anisotropic organometallic layer, layer thickness is achieved on the basis of molecular self-assembly that correspond to one hundred times the extension of the constituting molecules. The resulting organometallic material has an anisotropic X-ray characteristic as the signature of elongated objects containing metal that stand upright on the substrate and, in the case of photodimerized coumarin molecules, have a typical distance of about 2.7 nm. The correspondence of this distance to the length of the molecules used shows that the molecules bond the objects containing metal to each other, thus defining their distance.

Rutherford backscattering experiments make it possible to derive a homogeneous depth distribution of the metal within the layer according to the invention. The elements silver and sulfur are distributed stoichiometrically, that is to say, the silver-to-sulfur ratio is 1:1. On the basis of the findings so far, the layer grows exclusively perpendicular to the surface. This property can be utilized to produce three-dimensional structures by means of merely laterally pre-structured substrates (e.g. with microcontact stamps). Consequently, it is possible, for example, to control the growth of a 600 nm-thick structure by means of a monomolecular layer. The lateral resolution of this 3D self-assembly process is primarily to be found on the molecular level, in other words, in the range from 1 nm to 10 nm, and is only limited by the resolution of the pre-structuring.

The method according to the invention permits the production over large surface areas of a homogeneous (roughness: typically 10% of the layer thickness) and anisotropic organometallic layer whose three-dimensional molecular architecture forms in a defined manner with respect to the substrate plane. When suitable metals and organic molecules are selected, this anisotropic architecture yields defined anisotropic, electric, electronic, optical, dielectric and mechanical properties that can be utilized to manufacture technical functional units.

Organometallic layers according to the invention entail a number of advantages. Owing to the anisotropic growth process, ordered, but not crystalline, organometallic layers are created. Even though crystallinity leads locally to an excellent order and anisotropy, the crystal boundaries always encountered in actual practice cause, for instance, light scatter or impaired charge transport properties in the materials. If a crystalline material grows epitaxially on a substrate, tensions often occur in the material, which has a detrimental effect on the material properties and on the adhesion of the layer. These drawbacks may be absent in organometallic layers produced with the present method. Therefore, organometallic layers according to the invention exhibit the outstanding properties of crystalline materials, that is to say, a high level of order and anisotropy, without displaying their disadvantages, i.e. the presence of crystal boundaries and a mismatching vis-à-vis the substrate.

Another advantage of the method according to the invention is that the anisotropic growth process makes it possible to achieve high aspect ratios. The fact that a metal film can be transformed into a film that is many times thicker by means of build-up with organic molecules leads to the definition of an aspect ratio amplification factor that, in the experiments so far, has taken on values between 10 and 30. Since, with conventional methods, it is generally easier to produce laterally highly resolved structures with a small aspect ratio, the present method makes it possible to use given lateral structures to produce structures with a considerably higher aspect ratio. By way of an example, this advantage will be explained on the basis of a 30 nm-thick metal film with which depressions having a depth of 600 nm and a width of 200 nm can be produced. This yields an aspect ratio of 3:1 through amplification by a factor of 20. In principle, there appears to be no limitation to the aspect ratio.

Since the organometallic structures may only grow in the desired regions and no material is deposited that then has to be subsequently removed once again, as is usually the case with lift-off methods, the present method can save resources. Due to the small number of method steps, the use of solvent and cleansers may be considerably reduced.

The smallest possible structure size is fundamentally situated within the molecular scale realm, that is to say, in the range of 1 nm. In contrast to conventional lithography with photons, there are no resolution boundaries caused by diffraction in the present invention.

When the microcontact stamp technique is employed for the pre-structuring, the lower limit for the structure size is currently about 200 nm, in special cases even below 50 nm, but with a considerable greater distance between the smallest structures. The advantage of the microcontact stamp technique lies at least partially in the fact that there is practically no upper limit since very large compression rollers can be used. In many lithographic applications, it is precisely this possibility of simultaneously being able to structure very small details on large surfaces that is particularly important. This advantage of the microcontact stamp technique over other lithographic methods such as, for example, exposure to ultraviolet light, to ion or electron beams, can thus be combined with the above-mentioned properties, that is to say, anisotropy, three-dimensional growth with steep edges.

Therefore, the present invention is suitable for many lithographic applications, especially since aspect ratios of 1 and more can be easily achieved, for the production of two-dimensional and three-dimensional photonic crystals or, by filling the structures, also for the production of materials having a photonic band gap. Together with the possibility of lateral structuring, the material selection opens up a wide array of possibilities for manufacturing devices with metal-insulator or metal-semiconductor structures for the realm of microelectronics or nanoelectronics.

FIG. 1 shows a schematic depiction of the method according to the invention for lithographic structure formation (FIGS. 1*a* to 1*d*): by means of a microcontact stamp 10, an approximately 2 nm-thick monolayer 20 of eicosanthiol is stamped onto an approximately 10 nm-thick silver film 30 (FIG. 1*b*), which is present on a substrate 40. The specimen thus prepared is subsequently immersed into a solution 50 containing photodimerized coumarin molecules that have been functionalized with two sulfur terminal groups (FIG. 1*c*). Instead of another self-organizing monolayer, these molecules form a layer 60' in the non-printed regions (FIG. 1*c*), which ultimately grows to form a 200 nm-thick layer 60 (FIG. 1*d*). In order to obtain a three-dimensional impression, the resultant structures were imaged by means of scanning-electron microscopy (SEM) at an angle of 45° (FIGS. 1*e* and 1*f*).

Figure 2:
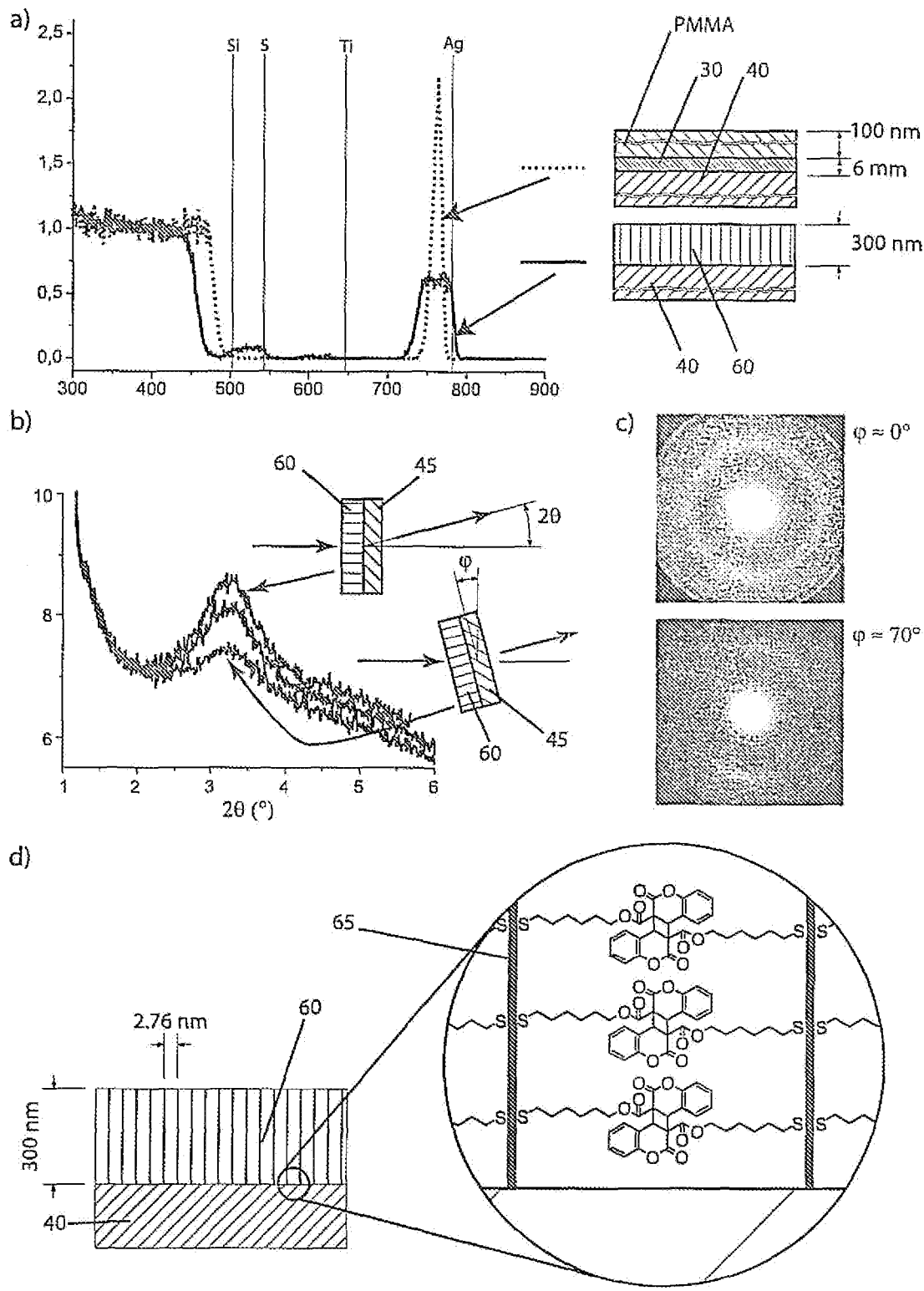
FIG. 2 shows examinations of a layer according to the invention:
  a) Rutherford backscatter experiments (RBS),
  b) X-ray diffraction examinations and
  c) small-angle scatter images,
  d) schematic depiction of the structure as it was derived from the examinations.

In FIG. 2, RBS measurements (FIG. 2*a*) show that sulfur as well as silver are homogeneously distributed over the thickness of the layer and that both elements are contained in equal amounts in the specimen. For the X-ray analysis, specimens were produced on polyimide substrates 45. X-ray diffraction examinations (FIG. 2*b*) show a peak at 3.3° if the X-ray is parallel to the surface normal of the specimen. This peak position corresponds to a correlation length of 2.7 nm (FIG. 2*b*). If the specimen is rotated by 15°, the intensity of the reflection drops significantly. The small-angle scatter images from FIG. 2*c* taken with a 2D detector show the same effect, which is the signature for the anisotropic structure of the specimen. The anisotropy can be interpreted as follows: as shown in FIG. 2*d*, long, thin objects 65 containing silver stand perpendicular to the surface of the substrate 40 and are kept at a distance by horizontally arranged organic molecules.

By means of the alternative method shown in FIG. 3, it is possible to produce structures having an inverted layout. After a laterally structured self-organizing monolayer 21 of the coumarin thiol molecule has been stamped (FIG. 3*a*), this monolayer is used as an ultra-thin resist layer in order to etch the metal film 30 (the copper) situated underneath it (FIG. 3*b*). After the wet-chemical etching process, the specimen is immersed into the coumarin solution, as a result of which a 600 nm-thick organometallic layer 60 is formed (FIG. 3c). Here, the layer 60 grows in the previously stamped regions rather than in the non-stamped regions as in FIG. 1. The SEM images shown in FIGS. 3d to 3i were taken at an angle of incidence of about 45°.

FIG. 4 illustrates the creation of covered channels using bottom-up lithography and demonstrates that the growth process takes place at the bottom on the substrate and not on the solvent boundary surface. For this purpose, an incompletely etched copper layer 30 is used on the substrate 40 that exhibits clear-cut thickness gradients that were created here by means of stamping with a relatively flat stamp 10 and incomplete etching in the non-stamped regions 26 (FIG. 4a). Then a thiolate film 60' is made to grow (FIG. 4c) everywhere on the copper layer 30 (FIG. 4b) thus structured. This growth, however, soon comes to a halt in the particularly thin regions 70' (FIG. 4d). Since the surrounding regions in the layer 60 have continued to grow, cavities 70 are formed there (FIG. 4e). The cross section in FIG. 4f was produced with a focused ion beam and the REM image was taken at an angle of incidence of about 52°.

The production method will be described in greater detail below with reference to three exemplary embodiments:

EXAMPLE 1

According to FIGS. 1a and 1b, first of all, a silicon wafer as the substrate 40 is provided with an approximately 10 nm-thick silver layer 30. Subsequently, for coupling purposes, a 2 nm-thick titanium layer is sputtered on using direct current (basic pressure: $9 \cdot 10^{-7}$ mbar, $2 \cdot 10^{-2}$ mbar of argon, 50 W forward power for titanium, 60 W for silver, 100 W for copper).

Subsequently, for the lateral structuring, a monolayer pattern 20 made of eicosanthiol is stamped on. For this purpose, an eicosanthiol solution (2 mmoles in ethanol) is dripped for 10 seconds onto a stamp 10 made of PDMS (polydimethyl siloxane). After being dried in a nitrogen stream, after another 20 seconds, the stamp 10 is pressed onto the coated substrate for 60 seconds.

Afterwards, the specimen is immersed into a 2-molar solution 50 of 6-mercapto-hexyl coumarin-3-carboxylate in toluene (FIG. 1c). This thiol-functionalized coumarin derivative was synthesized by means of the esterification of coumarin-3-carboxylic acid with 6-chloro-1-hexanol, followed by the substitution of chlorine with sulfur and treatment with a mixture of hexamethyl disilathiane and tetrabutyl ammonium fluoride.

In order to produce photopolymerized molecules containing two functional groups, the solution 50 is exposed for five minutes to a source of UV radiation. To this end, a closed glass flask is exposed at a distance of 10 cm to the light of a mercury UV lamp. In this process, shortwave light below 305 nm is kept out by means of an absorption filter. Coumarin is known for its photodimerization reaction, which takes place under illumination at wavelengths above 300 nm.

When the stamped specimens are left in the solution 50 for two hours, a thick film 60 is formed in the non-stamped regions (FIG. 1d).

The SEM images in FIGS. 1e and 1f show that the regions of the specimens that were protected by the eicosanthiol monolayer remain unaffected, while an approximately 200 nm-thick film 60 is formed in the other places. It is not unexpected that the coumarin derivative molecule occupies the unprotected regions. In contrast, it is known that many other thiol molecules, including coumarin thiols, form a densely packed, self-organizing monolayer on the surface of coinage metals. However, the formation of a 200 nm-thick layer in the previously exposed solution is surprising. This film thickness is achieved after about 2 hours and no longer changes after that.

During the growth of organometallic layers, the metal present on the substrate is consumed, that is to say, incorporated into the layer. The coumarin derivative now has two potential bonding sites for these incorporated metal atoms, namely, the sulfur, which establishes a thiolate bond with coinage metals, and the coumarin group, which is capable of creating metal complex bonds. In order to clarify the question as to in which of the two sites the metal is incorporated into the layer, disulfide molecules of this coumarin derivative were synthesized. It was found that these molecules are likewise capable of building up organometallic layers on silver substrates. This fact, together with the correlation length ascertained experimentally, that is to say, the typical distance of the metal atoms, which corresponds approximately to the dimer length, were an indication of a complex bond with coumarin. In this case, the disulfide bond would be present in a chemically unchanged form.

Moreover, the molecules N,N-bis(6-mercaptohexyl)-4,4-bipyridine dibromide, 1,2-ethane dithiol, 1,3-propane dithiol, 1,4-butane dithiol, 1,5-pentane dithiol, 1,6-hexane dithiol, 1,8-octane dithiol, 1,9-nonane dithiol, 1,2-benzene dithiol, 1,3-benzene dithiol, 1,4-dithioerythritol, 4,5-diamino-2,6-dimercaptopyrimidine, 6,8-dimercaptopurine N,N-bis(6-mercaptohexyl)-4,4-bipyridine dibromide with two functional groups as well as trithiocyanuric acid and trimethylopropane-tris(3-mercaptopropionate) with three functional groups were used to produce inventive organometallic layers on substrates made of silver, copper or the alloys $Cu_{75}Ni_{25}$, $Cu_{75}Zn_{20}Ni_5$ or $Cu_{89}Al_5Zn_5Sn_i$.

EXAMPLE 2

FIG. 2a presents the results of Rutherford backscattering experiments (RBS), which were conducted with 2 MeV He particles and which provide information about the depth distribution of the silver in the layer. There is a homogeneous depth distribution of silver, sulfur and carbon in the grown layer. Only the thin coupling layer made of titanium remains on the silicon boundary surface. The compact silver layer originally deposited onto it is no longer on the boundary surface after the process, but rather, is completely consumed during the process and is homogeneously incorporated into the grown layer.

In addition to depth distribution, the RBS experiments also yield the elementary ratio of sulfur to silver within the layer. Within the scope of the measuring accuracy, it amounts to exactly 1:1 (±0.05). Therefore, the results show the formation of an organometallic layer at a fixed stoichiometric ratio of the elementary components.

In order to carry out X-ray examinations on the organometallic material, it is necessary to prepare the specimens on a substrate that is X-ray neutral. For this purpose, first spin coating is employed to apply a polyimide film 45 onto an NaCl crystal as the substrate and then it is cured at about 400° C. [752° F.]. Using a 15 nm-thick silver film, an approximately 300 nm-thick transparent organometallic layer 60 is formed on this substrate. For the X-ray examination, the polyimide film 45 with the organometallic layer was separated from the substrate.

At a perpendicular incidence of the X-ray, that is to say, the ray is parallel to the surface normal of the specimen, a clear-cut peak can be seen at $2\theta=3.3°$ (FIG. 2b). The position of this peak corresponds to a correlation length of 2.7 nm. When the specimen is rotated by 5°, the intensity of this peak drops significantly. This effect is further intensified by a rotation of the angle of incidence by 10°.

The small-angle scatter images from FIG. 2c show the same effect: when the specimen was rotated by 70° around its polar axis, the equatorial intensity disappears completely while the polar intensity gains in strength. Thus, the examined specimen has a texture or anisotropy, whereby the scatter-active objects in the center are exactly perpendicular to the surface.

The following conclusions can be drawn from the experiments:

the silver is homogeneously distributed over the entire layer thickness and does not remain on the substrate;

the number of incorporated metal atoms corresponds to the number of coumarin derivative monomers contained in the layer;

the organometallic layer has an anisotropic architecture.

This structural model is supported by the fact that the existence of silver anode wires as well as of nanoplates containing silver, in other words, the scatter objects in our model, had already been confirmed experimentally. The difference of the structure of known organometallic materials from that of our model lies in the fact that the head-to-head bond in our dimer is covalent. Therefore, this is a dithiolate since the constituting molecule, i.e. the photodimer, is a dithiol. Here, too, X-ray examinations reveal considerably brighter reflections, which points towards a weakly ordered structure.

These findings indicate the structure of the organometallic layer 60 schematically shown in FIG. 2d: the photodimerized coumarin molecules are incorporated horizontally into the organometallic layer. Both ends of the molecules containing sulfur bond with a long, thin object 65 containing silver, which stands perpendicular to the surface of the substrate 40. Therefore, the molecules define the experimentally ascertained distance of 2.7 nm between these objects. This length matches the estimated structure length of a coumarin-thiol photodimer. Since up until now, no X-ray reflections of a higher order are to be seen, it is not possible to derive any conclusions about the long-range order of the objects containing silver. A lamellar arrangement of plates containing silver or a hexagonal arrangement of cylinders containing silver is compatible with the results found, whereby both arrangements are of a short range. The thickness of these objects has to be in the range of a few angstrom in order to fulfill the described steric and stoichiometric boundary conditions, that is to say, the space filling and the sulfur-to-silver ratio.

The present organometallic material can be classified as a dithiolate which—unlike the known dithiolates that are likewise formed in the form of powder from precipitation reactions—is formed in a substrate-induced manner and in the form of a homogenous layer. Silver nanowires have been recently discovered that, under ambient conditions, form a catalytically active, crystalline, organic host material. Monocrystalline regions that are filled with these silver nanowires were produced and examined by means of X-ray diffraction. The dithio molecules produced with this method could be bonded with such objects and could keep them at a distance.

Independently of the structural details, the X-ray data shows that the organometallic layer 60 is built-up anisotropically with respect to the surface of the substrate 40. This allows the conclusion that this is an anisotropic, substrate-induced growth process. This interpretation is in harmony with the occurrence of steep edges and thus with the high aspect ratios achieved, as can be seen, for example, in FIGS. 1e and 1f. Only anisotropic growth processes can give rise to such steep edges. This property, together with the fact that the growth of the organometallic layer is completely suppressed and thus laterally controlled by a self-organizing monolayer of another molecule, means that this structuring method is of interest for all technical fields in which lithography plays a role.

After the end of the growth process, that is to say, when all of the metal has been consumed, the metal regions that had been previously passivated by printing remain unaffected. These remaining metal regions can serve, for instance, as electric contacts or as substrate for another deposition process (vapor deposition process, electrodepostion or growth of another organometallic film with another molecule having other physical or chemical properties).

EXAMPLE 3

For some applications, these remaining metal regions are not desired. This is the case in the third embodiment according to FIG. 3. The metal layer 30 (here, an approximately 30 nm-thick copper layer) is first stamped with a monolayer 21 of a protective molecule. Subsequently, the metal is selectively etched away in the non-stamped regions by means of a wet-chemical etching process. For this purpose, the coumarin molecule used for the growth of the organometallic layer 60 has proven to be particularly advantageous. After a few seconds of contact time of the stamp, it already shows an outstanding resistance to cyanide caustic water on silver and against ammonium peroxide sulfate caustic water on copper.

This process is schematically shown in FIGS. 3a to 3c. After the stamping of a coumarin thiol layer 21, which is present on a 30 nm-thick layer 30 made of copper that is applied onto a 2 nm-thick titanium coupling layer on a substrate 40 made of silicon oxide, the specimen was immersed for 20 seconds in an etching liquid, as a result of which the copper layer 30 in the unprotected regions is completely removed. For this purpose, a coumarin solution (11 mg of coumarin thiol in 12 ml of ethanol) is dripped for 60 seconds onto a stamp 10 made of PDMS. After being dried in a nitrogen stream, after another 30 seconds, the stamp 10 is pressed for 60 seconds onto the substrate 40 freshly sputtered with copper 30. Afterwards, the specimen is etched for 2 seconds in an aqueous 0.07-molar solution of ammonium peroxodisulfate. After being washed in demineralized water and being dried in a nitrogen stream, the specimen is immersed into an UV-irradiated coumarin solution, where it is left for 3 hours.

If the thus prepared specimen is subsequently placed into the previously exposed coumarin thiol solution, an organometallic layer is systematically formed only in those places where metal is still present. The structures in FIG. 3c are inverted compared to the structures from FIG. 1d. The growth takes place in the originally printed regions. The scanning electron microscopic image in FIG. 3h shows the zigzag line from FIG. 1f in inverted form. Instead of the raised line from FIG. 1f, the alternative method leads to a trench with a depth of 600 nm (FIG. 3h). Consequently, a 600 nm-thick organometallic layer 60 is formed out of the 30 nm-thick copper layer 30. Exactly like before, here too, an amplification factor of 20 is achieved relative to the layer thickness.

The experimentally observed roughness of the flanks of this trench can be directly ascribed to the roughness that is already created during stamping and during the subsequent etching process. Since there was no more copper present at the bottom of the trench, no organometallic layer is formed there either, whereas 10 nm behind the etched edge, the organometallic layer 60 has already reached its full thickness. This result very impressively demonstrates the perpendicular growth process of the layer. This edge consistency proves how deterministically this growth process works and thus the potential that this new lithographic process has. This is particularly true in view of the fact that pre-structuring processes that are compatible with this method and that have a considerably higher lateral resolution already exist. This is where, for instance, electron-beam lithography or structuring methods based on a scanning probe are an obvious choice.

The invention claimed is:

1. A method for producing an organometallic layer, comprising:
providing a substrate having at least a layer including atoms of an oxidizable metal on a surface of the substrate; and
growing the organometallic layer at locations on the surface of the substrate where the atoms of oxidizable metal are disposed by exposing the surface to a fluid comprising organic molecules having at least two functional groups that contain elements of main group VI such that the atoms of the oxidizable metal form a bond with the organic molecules and the atoms of the oxidizable metal provided by the substrate are incorporated stoichiometrically into the organometallic layer during the growth of the organometallic layer;
wherein a thickness of the organometallic layer is determined by a duration of the exposing, a thickness of the layer including the atoms of the oxidizable metal, and the number of organic molecules in the fluid.

2. The method as recited in claim 1, wherein the functional groups comprise at least one of sulfur and selenium.

3. The method as recited in claim 1, wherein the functional groups comprise at least one of thiol groups and disulfides.

4. The method as recited in claim 1, further comprising dimerizing second organic molecules having, at least one function group comprising a first element of the main group VI so as to form the organic molecules having at least two functional groups including elements of main group VI before or during the exposing of the substrate to the fluid.

5. The method as recited in claim 1, further comprising exposing the substrate to a second fluid comprising at least one additional type of organic molecule at the same time, or after the exposing the substrate to the fluid comprising organic molecules having at least two functional groups that contain elements of main group VI.

6. The method as recited in claim 1, wherein the substrate comprises at least one of silver, copper, silver oxide, copper oxide, a silver alloy and a copper alloy.

7. The method as recited in claim 1, wherein the substrate comprises at least one of a semiconductor wafer coated with a layer of metal, metallic particles, and metal-coated particles.

8. The method as recited in claim 1, wherein the substrate comprises at least two consecutive layers including different metals.

9. The method as recited in claim 1, wherein regions of the surface are free of the oxidizable metal.

10. The method as recited in claim 1, further comprising providing a cover layer, to regions of the surface so as to cover the atoms of the oxidizable metal in the regions.

11. The method as recited in claim 10, wherein the cover layer, comprises a monolayer of thiol molecules.

12. The method as recited in claim 1, wherein first regions of the surface are free of the oxidizable metal, and further comprising providing a cover layer to second regions of the surface so as to cover the atoms of the oxidizable metal in the second regions, the thickness of the organometallic layer being limited by the thickness of the layer of atoms of oxidizable metal in the first regions of the surface not covered by the cover layer.

13. The method as recited in claim 12 wherein the providing a substrate is performed so that the thickness of the layer of atoms of the oxidizable metal includes regions with local minima such that at least one of cavities and tunnel-like structures are formed in the organometallic layer in these regions.

14. The method as recited, in claim 13 wherein the local minima are greater than zero.

15. The method as recited in claim 13 wherein the at least one of cavities and tunnel-like structures include a substance incorporated therein.

16. The method as recited in claim 15 wherein the substance is a metal.

17. A method for producing an organometallic layer, comprising:
providing a substrate having a layer including atoms of an oxidizable: metal on at least a portion of a surface of the substrate; and
growing the organometallic layer on the portion of the substrate having the layer including atoms of an oxidizable metal by exposing the surface to a fluid comprising organic molecules having at least two functional groups that include elements of main group VI,
wherein, during the growth of the organometallic layer, the atoms of the oxidizable metal provided by the substrate are consumed and incorporated stoichiometrically into the organometallic layer and a bond is formed between the atoms of the oxidizable metal and the organic molecules; and
wherein a thickness of the organometallic layer is determined by a duration of the exposing, a thickness of a layer on the substrate including the atoms of the oxidizable metal, and the number of organic molecules in the fluid.

18. The method as recited in claim 17, wherein the functional groups comprise at least one of sulfur and selenium.

19. The method as recited in claim 17, wherein the functional groups comprise at least one of thiol groups and disulfides.

20. The method as recited in claim 17, wherein regions of the surface include a cover layer covering the atoms of the oxidizable metal.

* * * * *

UNITED STATES PATENT AND TRADEMARK OFFICE
CERTIFICATE OF CORRECTION

PATENT NO. : 8,222,141 B2
APPLICATION NO. : 11/916512
DATED : July 17, 2012
INVENTOR(S) : Walheim et al.

Page 1 of 1

It is certified that error appears in the above-identified patent and that said Letters Patent is hereby corrected as shown below:

Title Page;

Field (73) which reads:

"Assignee: Forschungzentrum Karlsruhe GmbH; Karlsruhe (DE)"

should read:

"Assignee: Forschungszentrum Karlsruhe GmbH; Karlsruhe (DE)"

Signed and Sealed this
Sixteenth Day of October, 2012

David J. Kappos
*Director of the United States Patent and Trademark Office*